United States Patent Office 3,094,425
Patented June 18, 1963

3,094,425
CEMENT GRINDING AID AND PACK SET INHIBITOR
Alfred B. Adams, Melrose, Emery Farkas, Cambridge, and Francis J. Mardulier and Dunbar L. Shanklin, Winchester, Mass., assignors to W. R. Grace & Co., Cambridge, Mass., a corporation of Connecticut
No Drawing. Filed Feb. 2, 1961, Ser. No. 86,578
7 Claims. (Cl. 106—90)

This invention relates to a new composition of matter useful for improving the grindability of and reducing pack set in Portland cement and similar materials.

More particularly, this invention proposes the use of a combination of alignin sulphonate and calcium acetate with, preferably, a catalyst or accelerator such as triethanolamine, as a cement additive. When this additive is added in amount of 0.01 to 0.05 weight percent (total solids) during the grinding of cement clinkers, it increases the grinding efficiency, and thereafter inhibits the occurrence of pack set in the field.

Most cements when compacted by vibration, e.g., when transported in a hopper car, become semi-rigid and will not flow until considerable mechanical effort has been applied to break up the compaction. This condition is known as "pack set," and is to be distinguished from warehouse or bag set caused by incipient hydration. It is known that a cement is less likely to pack set if certain additives are incorporated into the cement during or after grinding.

Cleavage of the particles during grinding of cement clinkers exposes fresh or nascent surfaces. The fresh surfaces have high energies or reactivities probably because of the breaking of ionic bonds. The surface forces of the particles persist for some time after grinding and lead to pack set and/or poor cement fluidity if they are not properly reduced. Undue reduction or the complete absence of surface forces or attraction between the cement particles is undesirable because the cement becomes excessively fluid or flowable. If, on the other hand, the surface forces are too great, the cement tends to pack set and to have low bulk densities because of the presence of high void volume agglomerates. Low bulk densities mean that less cement by weight can be stored in a hopper or silo.

What one wishes to achieve is an optimum or controlled state of dry dispersion of the ground cement particles in air. Proper control of the dispersion of the particles in the air-continuous phase leads to the desired degree of fluidity both during and after grinding.

It has been known that certain polar molecules when added to the cement either during or after grinding will attach to the particles and reduce their surface forces. If the amount of additive used and/or if the time of addition are not correct, however, optimum dry dispersion is not obtained. For example, if an unduly active additive is present during grinding, it will cause a cement to have an extreme fluidity while in the mill. This will result in the cement passing rapidly through the mill before it is reduced to the desired size and thus in an increase in recycle of oversized material. The same additive, however, may give acceptable performance if mixed with the cement after grinding. Conversely, an additive which produces the desired degree of dry dispersion when ground with the clinker may or may not be effective if admixed after grinding. While these general principles are known, the particular response that a cement will display to specific additives is difficult to predict.

In the present invention, it has been found that the combination of calcium acetate with a lignin sulfonate is both an effective grinding aid and a pack set inhibitor when added to the cement mill and interground with the cement. Only a very small, economically acceptable, amount of this additive need be used. It is believed that the calcium acetate and lignin sulfonate remain liquid or largely so during the grinding at elevated temperatures and are mechanically dispersed over the nascent surfaces, at about the time of their formation. The additives appear to cooperate and so reduce the surface forces as to place the cement in the desired state of dry dispersion that results in improved grinding and mill retention times as well as facilitating subsequent storage and transporting. It may be that the sulfonate and acetate are taken up only by the most active sites of the fresh surfaces, leaving the remainder of "unneutralized" portion of the surfaces to exert a beneficial effect during grinding and thereafter, or one may immediately seek the most active sites, while the other has a delayed action effect.

The data in the following table illustrate the effects that the composition of this invention has on the grinding of cement clinkers, on the ground cement and on the mortar made therefrom. The data appearing in this table were obtained by testing individual batches of the same type I cement, each of which was prepared in the following manner; the clinker was charged to a laboratory steel ball grinding mill; the mill was closed and heated to a temperature between 210° F. and 230° F. prior to rotation; and the additive was then placed in the mill by means of a pipette pushed through a hollow shaft. After a fixed number of revolutions, taking about 70 minutes, the mill was stopped and the pack set index and other properties of the ground cement were determined.

TABLE

*Effect of Additives on Type I Cement*

| Additive | Weight Percent Additive (Total Solids) | BSA, Sq. cm./gm. | Air, Percent | Pack Set Index | Compressive Strength, p.s.i. | | |
|---|---|---|---|---|---|---|---|
| | | | | | 1 day | 7 days | 28 days |
| Blank | | 3,100 | 10.3 | 68 | 572 | 2,718 | 4,343 |
| CLS | 0.04 | 3,100 | 11.5 | 12 | 545 | 3,050 | 4,800 |
| CLS-TEA | 0.04 | 3,160 | 11.3 | 9 | 672 | 2,900 | 4,975 |
| Acid | 0.04 | 3,100 | 10.3 | 6 | 745 | 3,275 | 5,200 |
| Invention | 0.04 | 3,180 | 10.7 | 4 | 690 | 3,100 | 5,140 |

Notes:
BSA: Blaine Surface Area by ASTM C204-55.
Air by ASTM C185-58T.
Compressive strength by ASTM C109-58 (using 2 inch cubes).
CLS: 100 percent desugared calcium lignin sulphonate (as water solution).
CLS-TEA: 86 percent CLS with 14 percent triethanolamine (as 35-37 percent water solution).
Acid: 100 percent acetic acid.
Invention: 61.5 percent CLS, 13.5 percent TEA, and 25.0 percent calcium acetate (as 35-37 percent water solution).

The composition of this invention identified in the table was prepared in the following manner: 100 parts of water and 32 parts of triethanolamine were added, with stirring, to 240 parts of desugared calcium lignin sulphonate. The batch was uniformly mixed and then the calcium acetate was added with stirring.

Pack set index is a relative term which numerically indicates how prone a particular cement is to pack set when it is stored or transported in bulk. The pack set index is obtained in the following manner: 100 grams of cement are placed in a 250 cubic centimeter Erlenmeyer flask set on top of the variable vibrator. The vibrator is a Syntron "Single-Action" paper jogger, Model PJ–4, having a knob by means of which the vibration is adjusted. The same flask should be used for any series of tests. The flask should be placed in the same position of the vibrator for each test. A simple jig can be used to accomplish this. The adjustable knob is set at 165° F. and the Erlenmeyer flask containing the cement is vibrated for 15 seconds. After vibration, the flask is removed from the vibrator and fitted into a plywood jig, with the axis of the flask being horizontal. The flask is then rotated around its axis until the cement, which is compacted on the bottom of the flask, collapses. The Erlenmeyer flask is twisted with 180° turns at approximately 100 twists per minute. The number of 180° twists required for the cement sample to collapse establishes the pack set index.

The pack set index obtained by this method correlates well with the field performance of the cement. The higher the pack set index of the particular cement, the more prone a large volume of that cement is to pack set if stored or transported in bulk.

The calcium lignin sulphonate and the calcium lignin sulphonate-triethanolamine mixture identified in the table are commercially used additives. The surface area increases obtained with the composition of this invention as compared to the blank and the calcium lignin sulphonate compositions establishes that the present composition improves grinding efficiencies to a somewhat greater extent than the calcium lignin sulphonate composition, although a smaller amount of the sulphonate is used in the present composition. Experimental use of the present composition in two commercial plants handling type I cement resulted in average production increases of 8 to 10 percent over the use of the sulphonate-amine additive.

As shown in the table, the improvement in the compressive strength of the cement was about the same as that obtained with the commercially used additives. The present additive had little effect on air entrainment.

The pack set indices show that the present composition materially ameliorates the compacting tendency of cements. The improvement obtained is about equal to that obtained with acetic acid at the 0.04 weight percent level. It is better at the 0.02 weight percent level. Acetic acid is known to be one of the most effective pack set inhibitors available (see U.S. Patent 2,857,286). Aside from its obnoxious odor and corrosiveness, a pack set inhibiting amount of acetic acid is not usually added to a grinding mill because it excessively reduces retention time and impairs grinding rather than helping it. It is believed that while acetic acid can be effectively added in small amounts after grinding, its use during grinding gives adverse results because it vaporizes at the grinding temperature and becomes too available to the nascent surfaces, resulting in excessive reduction of the surface forces and undue fluidity.

At one commercial plant the dispersing properties of this composition permitted a bulk car to be loaded with 397.5 barrels of cement at the first filling, where normally only 375 barrels of the cement could be charged when the sulphonate-amine composition was used during grinding.

The weight ratio of calcium lignin sulphonate to calcium acetate used can vary from 1/1 to 20/1. It is preferably in the range of 2/1 to 5/1. The amount of triethanolamine or equivalent catalyst or accelerator (see U.S. Patent 2,031,621) is about 0 to 25 weight percent of the combined amounts of the sulphonate and acetate. The amount is preferably 8 to 15 weight percent.

The calcium acetate can be added as such to the calcium lignin sulphonate after it has been desugared, or it can be formed in situ during the desugaring operation. Desugaring is usually accomplished by boiling the lignin sulphonate with lime water and thereafter neutralizing the excess lime. The excess lime can be neutralized with the proper amount of acetic acid, in place of the mineral acid normally used, to form the desired amount of calcium acetate.

If the present composition is to be stored for some time, it is desirable to add a small amount of bacteriocide, such as phenol mercuric acetate.

The composition of this invention can most conveniently be prepared and handled as a 25 to 40 weight percent (total solids) solution in water.

Having described this invention, what is sought to be protected by Letters Patent is succinctly set forth in the following claims.

What is claimed is:

1. As a Portland cement additive, 1 to 20 parts of a lignin sulphonate admixed with 1 part by weight of calcium acetate.

2. A Portland cement grinding aid and pack set inhibitor consisting essentially of a water solution of 1 to 20 parts by weight of a lignin sulphonate, 1 part by weight of calcium acetate and 0 to 25 weight percent, based on the combined weigth of the sulphonate and acetate of an amine accelerator.

3. The composition of claim 2 wherein said amine accelerator is triethanolamine.

4. A dry Portland cement containing about 0.01 to 0.05 weight percent of an additive consisting essentially of 1 to 20 parts of calcium lignin sulphonate, 1 part by weight of calcium acetate and 0 to 25 weight percent of triethanolamine based on the combined weight of the sulfonate and acetate.

5. A process for reducing the tendency of Portland cement to pack set comprising admixing therewith 1 to 20 parts of a lignin sulphonate and 1 part by weight of calcium acetate during the grinding of the cement.

6. The process of claim 5 wherein triethanolamine is also interground with said cement in amount of about 0 to 25 weight percent based on the combined weight of the sulfonate and acetate.

7. A grinding aid and pack set inhibitor for Portland cement consisting essentially of an aqueous solution of 2 to 5 parts by weight of calcium lignin sulphonate, 1 part by weight of calcium acetate, and 8 to 15 weight percent of triethanolamine based on the combined weight of the sulphonate and acetate.

References Cited in the file of this patent
UNITED STATES PATENTS

| | | |
|---|---|---|
| 2,031,621 | Tucker | Feb. 25, 1936 |
| 2,141,571 | Kennedy et al. | Dec. 27, 1938 |
| 2,857,286 | Striker | Oct. 2, 1958 |

OTHER REFERENCES

Lewis: A Review of By Products of Sulfite Pulping," Tech. Ass'n. of Pulp & Paper Ind., July 8, 1948 (pages 51–53).